United States Patent
Chjonowski et al.

Patent Number: 5,256,196
Date of Patent: Oct. 26, 1993

[54] PRECIPITATED SILICA PASTE

[75] Inventors: Marian Chjonowski, Offenbach; Werner Nagel, Alzenau; Karl Meier, Alfter; Wolfgang Leonhardt, Frankfurt am Main; Heinz Esch, Bonn, all of Fed. Rep. of Germany

[73] Assignee: Degussa Aktiengesellschaft, Fed. Rep. of Germany

[21] Appl. No.: 808,804

[22] Filed: Dec. 18, 1991

[30] Foreign Application Priority Data

Dec. 24, 1990 [DE] Fed. Rep. of Germany ........ 4041827

[51] Int. Cl.$^5$ .............................................. C04B 14/04
[52] U.S. Cl. .................................... 106/482; 106/490; 106/2
[58] Field of Search ........................... 106/482, 490, 2

[56] References Cited

U.S. PATENT DOCUMENTS

| | | | |
|---|---|---|---|
| 3,924,029 | 12/1975 | Schutte et al. | 427/213 |
| 4,150,101 | 4/1979 | Schmidt et al. | 423/338 |
| 4,208,213 | 6/1980 | Müller et al. | 106/10 |
| 4,273,589 | 6/1981 | Nauroth et al. | 106/482 X |
| 4,308,074 | 12/1981 | Nauroth et al. | 106/466 |

FOREIGN PATENT DOCUMENTS

| | | |
|---|---|---|
| 350035 | 1/1990 | European Pat. Off. |
| 2728490 | 1/1979 | Fed. Rep. of Germany . |
| 3330447 | 3/1985 | Fed. Rep. of Germany . |
| 53-034829 | 3/1978 | Japan . |

*Primary Examiner*—Mark L. Bell
*Assistant Examiner*—Chris Gallo
*Attorney, Agent, or Firm*—Cushman, Darby & Cushman

[57] ABSTRACT

A precipitated silica paste is produced by dispersing precipitated silica in silicon oil. During the hydrophobing of precipitated silicas, the precipitated silica paste is added as a hydrophobing agent in the suspension phase. The product is spray-dried, tempered and ground.

3 Claims, No Drawings

PRECIPITATED SILICA PASTE

The present invention relates to a precipitated silica paste, to a method for producing it and to a method of using the precipitated silica paste to impart hydrophobic characteristics to precipitated silicas.

BACKGROUND OF THE INVENTION

It is known that precipitated silicas can be rendered waterproof with silicon oils in a dry state (see published German Patent Application DE-OS 26 28 975—U.S. Pat. Nos. 4,273,589 and 4,308,074). Such waterproofed precipitated silicas are used as defoaming silicas in detergents.

The precipitated silicas waterproofed according to the known method have the disadvantage that the silicon oil used as hydrophobing agent is not distributed uniformly on the surface of the silica.

There has been, therefore, a need for a method of producing precipitated silicas, waterproofed with silicon oil, which have a uniform distribution of the silicon oil.

SUMMARY OF THE INVENTION

The present invention provides a precipitated silica paste consisting of 5 to 15% by weight precipitated silica and 85 to 95% by weight silicon oil. The precipitated silica paste of the invention has sufficient stability for several days.

The invention also provides a method of producing a precipitated silica paste consisting of 5 to 15% precipitated silica and 85 to 95% by weight silicon oil in which silicon oil is placed in a receiver, precipitated silica is worked in using shearing forces and this dispersing process is continued until the precipitated silica paste obtained exhibits sufficient stability.

During the dispersing, the temperature of the precipitated silica can be elevated from room temperature to 50° C.

The invention further provides a method of waterproofing precipitated silicas using the precipitated silica paste of the invention consisting of 5 to 15% by weight precipitated silica and 85 to 95% by weight silicon oil in which a precipitated silica filter cake is liquefied in a known manner, the pH is adjusted to neutral or alkaline, preferably to pH=9, the amount of precipitated silica paste necessary for the waterproofing is added using a shearing device, the mixture is subsequently sheared, the suspension is dried, preferably spray-dried, the dried product is tempered and it is subsequently ground with an air jet mill.

The liquefaction of the precipitated silica filter cake can be carried out preferably according to Published German Patent Application DE-OS 24 14 478 (c.f. U.S. Pat. No. 4,150,101).

The precipitated silica suspension can have a solid content of 150 to 180 g/l. An Ultra-Turrax or a Kothoff mixing siren can be used as shearing device.

The waterproofed precipitated silica produced by the foregoing methods has a uniform coating of silicon oil. It can be used in detergents as a defoaming silica.

The method of the invention has the advantage that the tempering can be carried out with the non-ground product. This raises the capacity of the tempering step by a factor of 2 to 3.

DETAILED DESCRIPTION OF PREFERRED EMBODIMENTS

The invention is illustrated by the following examples.

The suspension hydrophobing of the invention is carried out in several test series. In particular, the influence of the pH of the suspension was investigated in detail. To this end, a VN3 membrane filter cake (approximately 23% solid) is liquefied by means of shearing forces and the addition of dilute hydrochloric acid or sulfuric acid (test series A), demineralized water (test series B) and dilute sodium hydroxide solution (test series C) and adjusted to the desired pH'es (3, 6 and 9). In the next step, the calculated amounts of the waterproofing paste are charged into the suspensions obtained. A silicon oil content of 13.5%, relative to the silica component (TS content), is selected as the base for the suspension. The waterproofing paste is worked in by means of the mixing siren at its highest speed.

The total shearing time is 45 minutes. Thereafter, the suspension is transferred without further filtration step into a porcelain dish and dried at 105° C. in a drying cupboard. The dried product is then ground on a UPZ mill (mechanical beater mill of the Alpine company) and tempered under standard conditions (1 hour/350° C.) in a Naber oven. Table 1 summarizes representative tests (test parameters/analytical data) from test series A-C. It can be seen that the suspension waterproofing, in both the alkaline and also in the neutral range provides in good hydrophobic properties—methanol wettability >60%—but that in the acidic range only products of lesser quality are obtained.

Further test series are carried out thereafter only in the "neutral" or "alkaline liquefaction" range. In test series D and E, the influence of the sequence of the method steps tempering and grinding on the product quality is investigated. The tests are carried out as described thereby; however, the further processing is divided after the method step of "drying". In the first instance, the "grinding" was carried out with subsequent "tempering". In the other instance, the series of the last method steps is reversed.

Table 2 summarizes representative tests (test parameters/analytical data) from test series D and E. It was surprisingly found that the sequence of the method steps "tempering" and "grinding" has no influence on the product quality as regards hydrophobic properties. Consequently, it is possible to utilize the higher bulk weight of the non-ground product in the "tempering" method step and, thereby, to achieve a higher space-time yield in this method step.

ENGINEERING TESTS

The knowledge gathered in the laboratory tests is checked in engineering tests. For the sake of better examination and better comparability, the tests were carried out only in the alkaline range. Instead of the "drying cupboard" drying unit, a spray drier is used.

The filter cake is liquefied thereby, with a dissolver disk and dilute sodium hydroxide solution, and adjusted to pH 9. Then the coating with silicon oil is carried out by adding the appropriate amount of waterproofing paste (13.5% silicon oil relative to the dry substance) in a liquefaction container. After an additional dispersing time of approximately 30 min., the suspension is spray-dried on the spray drier (centrifugal atomizer).

The spray-drying method step is followed by the tempering of the non-ground intermediate product at 350° C. The tempered product is subjected finally to an air-jet grinding.

TABLE 1

Test series A-C/ test parameters; analytical data

| Test | A | B | C |
|---|---|---|---|
| Suspension | | | |
| type | VN3 | VN3 | VN3 |
| pH | 3.0 | 5.8 | 9.0 |
| TS content [%] | 16.2 | 16.5 | 14.0 |
| Hydrophobing agent | | | |
| silicon oil | TG 50 | TG 50 | TG 50 |
| amount [%] | 13.5 | 13.5 | 13.5 |
| Drying | | | |
| aggregate | | drying cupboard | |
| time [h] | 12 | 12 | 12 |
| temperature [°X] | 105 | 105 | 105 |
| Tempering - aggregate | | Naber oven | |
| time [h] | 1 | 1 | 1 |
| temperature [°C.] | 350 | 350 | 350 |
| Sequence | | | |
| tempering | 2 | 2 | 2 |
| grinding | 1 | 1 | 1 |
| Analytical data | | | |
| pH | 3.35 | 7.52 | 10.3 |
| Sears number | | | |
| V1 [ml] | 5.9 | 0.2 | 1.3 |
| V2 [ml] | 4.2 | 0.8 | 0.8 |
| methanol wettability [%] | 48.8 | 63.7 | 63.7 |

TABLE 2

Test series D and E; test parameters; analytical data

| Test | D1 | D2 | E1 | E2 | E3 | E4 |
|---|---|---|---|---|---|---|
| Suspension | | | | | | |
| type | VN3 | VN3 | VN3 | VN3 | VN3 | VN3 |
| pH | 5.1 | 5.1 | 8.5 | 8.5 | 8.5 | 8.5 |
| TS content [%] | 18 | 18 | 13.3 | 13.3 | 15.3 | 15.3 |
| Hydrophobing agent | | | | | | |
| silicon oil | TG 50 | TG 50 | TG 50 | TG 50 | TG 50 | TG 50 |
| amount [%] | 13.5 | 13.5 | 13.5 | 13.5 | 13.5 | 13.5 |
| Drying | | | | | | |
| aggregate | | | drying cupboard | | | |
| time [h] | 12.0 | 12.0 | 12.0 | 12.0 | 12.0 | 12.0 |
| temperature [°C.] | 105 | 105 | 105 | 105 | 105 | 105 |
| Tempering | | | | | | |
| aggregate | | | Naber oven | | | |
| time [h] | 1 | 1 | 1 | 1 | 1 | 1 |
| temperature [°C.] | 350 | 350 | 350 | 350 | 350 | 350 |
| Sequence | | | | | | |
| tempering | 1 | 2 | 2 | 1 | 1 | 2 |
| grinding | 2 | 1 | 1 | 2 | 2 | 1 |
| Analytical data | | | | | | |
| pH | 7.1 | 7.1 | 9.85 | 9.8 | 9.8 | 9.95 |
| Sears number | | | | | | |
| V1 [ml] | 0.18 | 0.18 | 0.85 | 1.0 | 1.3 | 1.1 |
| V2 [ml] | 0.8 | 0.6 | 0.8 | 0.8 | 0.9 | 0.7 |
| methanol wettability [%] | 63.8 | 66.2 | 64.1 | 63.6 | 63.8 | 64.5 |

TABLE 3

Engineering tests SPT 180/200; test parameters; analytical data

| Test | SPT 180 | SPT 200 |
|---|---|---|
| Suspension | | |
| type | VN3 | VN3 |
| pH | 9.0 | 9.1 |
| TS content [%] | 16.1 | 18.6 (16.2) |
| Hydrophobing agent | | |
| silicon oil | Cp 50 | Cp 50 |
| amount [%] | 13.5 | 13.5 |
| Drying | | |
| aggregate | VTC-A test spray drier | |
| entry temperature [°C.] | 420 | 400 |
| exit temperature [°C.] | 80 | 80 |
| Intermediate product (spray-dried) | | |
| water content [%] | 5.2 | 4.4 |
| pH | 9.3 | 9.4 |
| conductivity [μS] | — | 650 |
| sieve tailings: | | |
| >45 μm [%] | 65.0 | 61.0 |
| >63 μm [%] | 35.0 | 34.0 |
| C content [%] | 4.2 | 4.37 |
| stamping weight [g/l] | 330 | 333 |
| Tempering | | |
| aggregate | D 10 pilot reactor | |
| temperature [°C.] | 350 | 330 |
| time [min] | 60 | 50 |
| Grinding | | |
| aggregate | Engineering LS mill | |
| grinding pressure [bar] | 3.5–4.0 | 3.5 |
| injector pressure [bar] | 5.5 | 5.5 |
| throughput [kg/h] | 20 | 20 |
| Final product | | |
| water content [%] | | |
| pH | 10.7 | 10.5 |
| average particle size [m] | 3.5 | 5.1 |
| C content [%] | 3.6 | 3.2 |
| stamping weight [g/l] | 110 | 110 |
| Sears number: | | |
| V1 [ml] | — | 4.1 |
| V2 [ml] | 2.9 | 1.6 |
| methanol wettability [%] | 65 | 67 |
| BET surface [m²/g] | 106 | 109 |

We claim:

1. Precipitated silica paste consisting of 5 to 15% by weight precipitated silica and 85 to 95% by weight silicon oil.

2. A method of producing the precipitated silica paste set forth in claim 1 which comprises placing silicon oil in a receiver, working the precipitated silica in using shearing forces and continuing this dispersing process until the precipitated silica paste obtained exhibits stability.

3. A method for hydrophobing precipitated silicas with the precipitated silica paste as set forth in claim 1 which comprising a liquefying a precipitated silica filter cake, adjusting the pH to neutral or alkaline, adding the amount of precipitated silica paste necessary for the hydrophobing using a shearing device, shearing the mixture, spray drying the suspension, and tempering and subsequently grinding the dried product.

* * * * *